United States Patent
Moldvai

(10) Patent No.: US 10,074,299 B2
(45) Date of Patent: Sep. 11, 2018

(54) PULSE WIDTH MODULATION FOR A HEAD-MOUNTED DISPLAY DEVICE DISPLAY ILLUMINATION SYSTEM

(71) Applicant: Caba Moldvai, Dublin, CA (US)

(72) Inventor: Caba Moldvai, Dublin, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 301 days.

(21) Appl. No.: 14/811,605

(22) Filed: Jul. 28, 2015

(65) Prior Publication Data

US 2017/0032729 A1    Feb. 2, 2017

(51) Int. Cl.
*G09G 3/20*     (2006.01)
*G02B 27/01*    (2006.01)
(Continued)

(52) U.S. Cl.
CPC ....... *G09G 3/2022* (2013.01); *G02B 27/0172* (2013.01); *G06T 19/006* (2013.01);
(Continued)

(58) Field of Classification Search
CPC .. G09G 3/2022; G09G 3/3648; G09G 3/3413; G02B 27/0172; H05B 33/0815
See application file for complete search history.

(56) References Cited

U.S. PATENT DOCUMENTS

| 6,519,013 B1 | 2/2003 | Nagai et al. |
| 7,446,785 B1 | 11/2008 | Hewlett et al. |

(Continued)

FOREIGN PATENT DOCUMENTS

| CN | 202435690 U | 9/2012 |
| DE | 102009026612 A1 | 12/2010 |

OTHER PUBLICATIONS

Karamiata, et al., "Implementation of Pseudo PWM Pulse to Adjust Brightness of LEDs in Video Displays", In Proceedings of International Conference on Innovations in Information Technology, Dec. 16, 2008, pp. 89-91.

(Continued)

*Primary Examiner* — Kevin M Nguyen
(74) *Attorney, Agent, or Firm* — Shook, Hardy & Bacon, L.L.P.

(57) ABSTRACT

In various embodiments, methods and systems for controlling display illumination is provided. A display illumination system supports maintaining color stability and reducing perceived flicker while changing the brightness of a display. The display illumination system supports light emitting diode (LED) sequencing using a pulse width modulation (PWM) control circuit for controlling the brightness and dimness of LEDs. In operation, the PWM control circuit drives the plurality of LEDs based on generating control signals for two or more subframes of an image frame. Specifically, within each subframe, at least two control signals are generated therein. In one embodiment, the display illumination system supports a display of an optical see-through head mounted display (HMD) device. In particular, the HMD device includes LEDs that allow a user to observe their physical surroundings, while LEDs and other optical elements add light into a visual path of a user to provide an augmented reality image.

20 Claims, 8 Drawing Sheets

(51) Int. Cl.
*G06T 19/00* (2011.01)
*G06T 19/20* (2011.01)
*G09G 3/34* (2006.01)
*G09G 3/36* (2006.01)
*H05B 33/08* (2006.01)

(52) U.S. Cl.
CPC ............ *G06T 19/20* (2013.01); *G09G 3/3413* (2013.01); *G09G 3/3648* (2013.01); *H05B 33/0815* (2013.01); *H05B 33/0818* (2013.01); *H05B 33/0848* (2013.01); *H05B 33/0866* (2013.01); *G02B 2027/0118* (2013.01); *G09G 2320/0209* (2013.01); *G09G 2320/0247* (2013.01); *G09G 2320/064* (2013.01); *Y02B 20/346* (2013.01)

(56) References Cited

U.S. PATENT DOCUMENTS

| | | | |
|---|---|---|---|
| 8,068,087 | B2 | 11/2011 | Feng |
| 8,405,691 | B2 | 3/2013 | Van Ostrand et al. |
| 2003/0020677 | A1* | 1/2003 | Nakano ................ G09G 3/3413 345/87 |
| 2007/0114949 | A1 | 5/2007 | Yu et al. |
| 2007/0212022 | A1 | 9/2007 | Zhou et al. |
| 2008/0055493 | A1 | 3/2008 | Hanano |
| 2008/0238341 | A1 | 10/2008 | Korcharz et al. |
| 2009/0244113 | A1* | 10/2009 | Bergquist ............. G09G 3/3413 345/691 |
| 2011/0267387 | A1 | 11/2011 | Baik et al. |
| 2012/0062709 | A1 | 3/2012 | Kerofsky et al. |
| 2012/0242236 | A1 | 9/2012 | Vaananen et al. |
| 2013/0321406 | A1 | 12/2013 | Harrold et al. |
| 2014/0092105 | A1 | 4/2014 | Guttag et al. |
| 2014/0307009 | A1* | 10/2014 | Hasegawa ............ G09G 3/2018 345/690 |
| 2015/0316772 | A1* | 11/2015 | Border ............... G02B 27/0172 359/630 |

OTHER PUBLICATIONS

"Pulse Width Modulation", Published on: Feb. 16, 2012, Available at: http://www.tftcentral.co.uk/articles/pulse_width_modulation.htm.

"International Search Report and Written Opinion Issued in PCT Application No. PCT/US2016/039704", dated Sep. 22, 2016, 12 Pages.

"Is it Possible to Implement Freesync or Gsync for VR?", Retrieved from <<https://web.archive.org/web/20150404020345/https://www.reddit.com/r/oculus/comments/3072s7/is_it_possible_to_implement_freesync_or_gsync_for/>, Apr. 4, 2015, 1 Page.

"International Preliminary Report on Patentability Issued in PCT Application No. PCT/US2016/039704", dated Jun. 6, 2017, 8 Pages.

\* cited by examiner

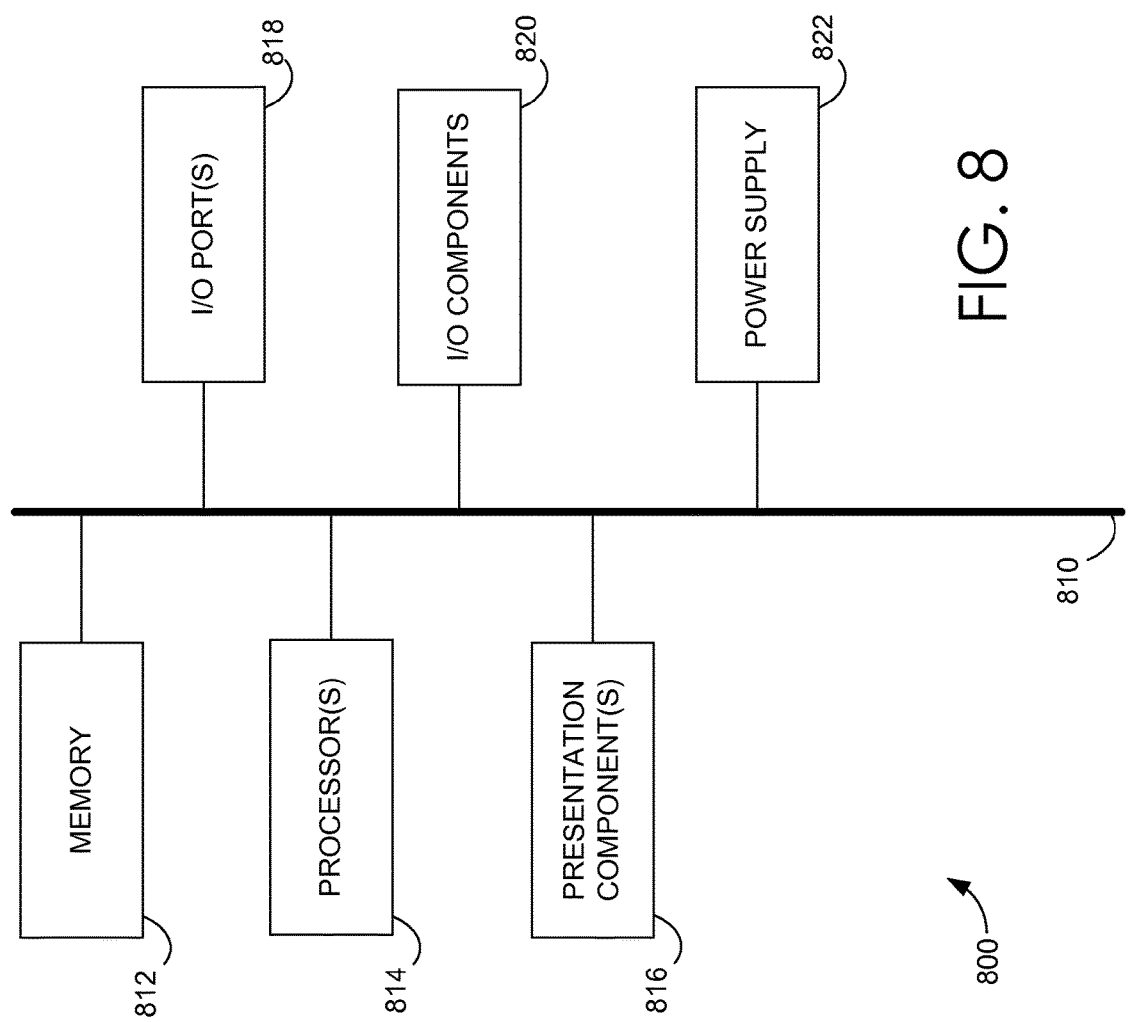

PULSE WIDTH MODULATION FOR A HEAD-MOUNTED DISPLAY DEVICE DISPLAY ILLUMINATION SYSTEM

BACKGROUND

Light emitting diodes (LEDs) can be used in a variety of lighting applications. LEDs are useful in a number of lighting applications including light for liquid crystal display (LCD) based monitors and television. LEDs can also be used in head-mounted display units that generate virtual-reality and augmented-reality images.

SUMMARY

Embodiments described herein provide methods and systems for controlling display illumination. In particular, a display illumination system supports maintaining color stability and reducing perceived flicker while changing the brightness of display. The display illumination system supports light emitting diode (LED) sequencing using a pulse width modulation (PWM) control circuit for controlling the brightness and dimness of LEDs. The PWM control circuit operates using a duty cycle of the PWM control circuit. In operation, the PWM control circuit drives the plurality of light sources based on generating control signals for two or more subframes of an image frame. Specifically, within each subframe, at least two control signals (e.g., PWM pulses) are generated. In one embodiment, the display illumination system supports maintaining color and reducing flicker while changing the brightness for a display of an optical see-through head mounted display (HMD) device. In particular, the HMD device includes LEDs that allow a user to observe their physical surroundings, while LEDs and other optical elements add light from a display component of the HMD into a visual path of the user to provide an augmented reality image.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 8 is a block diagram of an exemplary computing environment suitable for use in implementing embodiments of the present invention.

DETAILED DESCRIPTION

Figure 1:
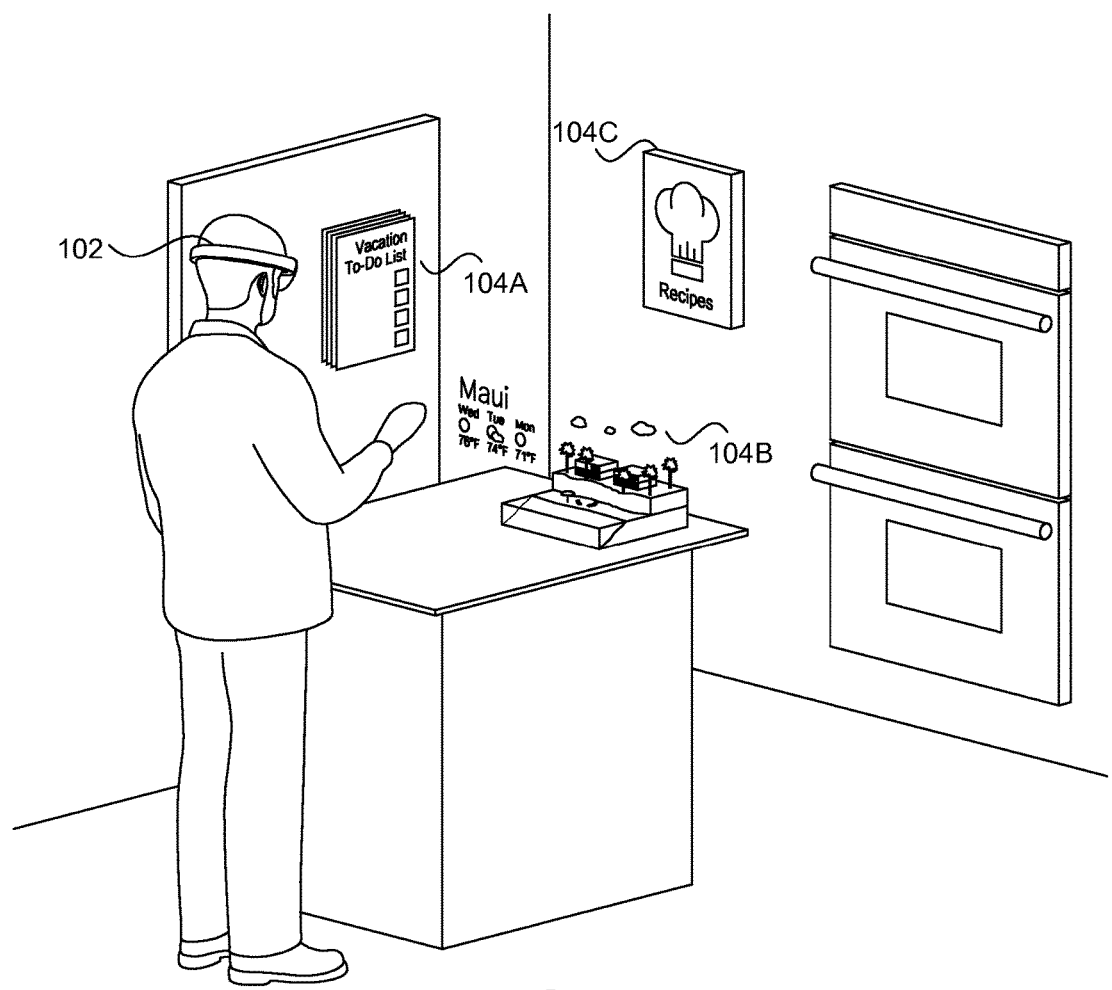
FIG. 1 is a schematic diagram showing exemplary augmented-reality images of a head-mounted device display unit, in accordance with embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In displays, an LED sequencer can support the illumination, specifically the brightness and dimness of the display, based on LED sequencing that can be implemented on monitors, televisions, or head-mounted display units. Conventional LED sequencers in display illumination systems can be deficient in generating quality images while changing brightness.

Conventional display illumination systems can be implemented using light emitting diodes (LED). An LED is a two-lead semi-conductor light source. In particular, an LED can be a pn-junction which emits light when activated. A display illumination system can be implemented with two or more LEDs. By way of background, LEDs have a rated current that indicate an amount of current that needs to flow to get the maximum light output. In a PWM driver, the current is switched at a high frequency between 0 and the rated output current. As such, the LED load is either off or running at its rated current. The ratio of on-time to off-time determines the LED brightness. By way of example, an LED can be dimmed to approximately 25% of its maximum brightness using PWM 25% duty cycle that causes the LED current to flow for 25% of a given amount time, and being turned off for the remaining 75% of the given amount of time.

A display illumination system implements a driving scheme for illuminating the LEDs. The driving scheme can drive light for a frame of a display, where the frame is divided into subframes. Each subframe can be associated with a color. In this regard, each frame can include a plurality of subframes that are supported by the display illumination system. A display illumination system can use red, green, and blue LEDs. Additionally, a white LED may be used. The light output during a driving scheme is perceived as a single color based on the combination of driven colors.

The display illumination system can support an LED sequencer that controls LED brightness based on LED current. In operation, the LEDs are turned on during an entire subframe. This operation can cause multiple issues. In particular, LED current that is used to operate brightness can cause a dominant wavelength of the LED to drift over the lifetime of the LED. LED drifting can cause color or white-point change in the LED. Also, the LED can be turned on in the midst of a transitional time in which a liquid crystal is in transition state from a previous subframe to the next subframe. When this occurs, remnants of a previous image content created by the liquid crystal causes visible color crosstalk, which degrades the user experience.

Conventional display illumination systems can also implement LED driving schemes that do not properly support a see-through head-mounted display (HMD). The HMD device operates optical elements such as prisms and holographic lenses to add light from a display component into a visual path of the user to provide an augmented reality image. Augmented-reality images as described herein comprise image, graphic, or other output provided to the user's eye by the augmented-reality emitter. Augmented-reality images provided by an HMD device generally appear superimposed on a background and may appear to interact with or be integral with the background. The background is comprised of a real-world scene (e.g., a scene that a user would perceive without the augmented-reality images emitted by the HMD device). For compelling augmented reality or other mixed reality scenarios, it is desirable to have the ability to have stable color without image flicker or other distortions while changing brightness and during normal operation at different brightness levels.

Embodiments described herein provide methods and illumination system for maintaining color stability and reducing flicker while changing the brightness. At a high level, the display illumination engine system implements a PWM (Pulse Width Modulation) that is used to adjust display brightness. The display illumination system having an LED sequencer can control LED brightness based on PWM. PWM can refer to a technique for getting analog results with a digital signal by varying the duty cycle of a digital signal in fine increments so that the average value of the PWM signal can be made to vary between 0% and 100%. Adjusting display brightness can include dimming the display. The PWM signal allows brightness to be changed based on varying a signal's duty cycle rather than directly switching the LED current, which behaves according to a non-linear function.

The display illumination system implements a PWM-based driving scheme that generates multiple PWM controls signals (e.g., PWM pulses) for defined portions of subframes (e.g., 412, 414, 416, and 418) of an image frame. Multiple PWM controls signals can also advantageously maintain a constant or approximately constant LED emission time. The emission time of control signals between a Tstart and a Tend can be about the same at high and low display brightness settings. A single control signal would cause the LED emission to vary because the control signal would be very short at low brightness settings and close to the entire subframe at a max brightness of the display. Using multiple PWM control signals for subframes within an image frame can result in a power-savings because local dimming may be implemented. Further, optical effects in areas where no image content is displayed in the eye-box may be reduced because the LEDs in those areas of an image where no content is displayed can be individually turned down.

The display illumination system can be configured to generate multiple PWM controlled light pulses to stimulate the human eye during a single color subframe, such that, the effect of perceived flicker is reduced. Conventional single PWM pulses per color frame can cause perceived image flicker due to concentrated emission times. Multiple PWM controls signals can advantageously support a distributed emission time. The plurality of control signals are generated during an emission time that is distributed over a series of control signals or pulses, in contrast to a single control signal that would cause the LED emission over a concentrated emission time. Multiple control pulses in contrast to single control pulses decrease time between pulses which reduces flicker. For example, an image with red content that is displayed using the display illumination system (note that the greed and blue LED are blocked by the liquid crystal) a viewer sees image content each time a pulse is generated, as such, when one short red LED is generated, the time difference between two red LED pulses is significantly longer than when a series of red pulses is generated. The optical effect of a distributed emission is reduced perceived flicker as the distance between triggering controls signals is also shortened.

The display illumination system also operates based on an adjustable timing framework that controls the start times and end times relative to a beginning portion of a subframe. The start times and end times can be adjusted to a fixed time based on a response time of the liquid crystal of the display. The response time can indicate identified time period when the transitional effects of a liquid crystal of a display (e.g., LCOS—liquid crystal on silicon) start to subside. The portions of the one or more subframes that are defined for controlling brightness using PWM can be configured to align with when the transitional effects in the liquid crystal have subsided. In this regard, the portion of the one or more subframes can be defined based on adjusted start times and end times. Controlling the start times and end times can support turning on the LEDs only after the transitional effects have subsided in the particular liquid crystal of the display. As such, a determination can be made to specifically identify a transitional effect time period for the liquid crystal being used in a display and utilize the identified transitional effect time period to define the adjusted start time and end times. Adjusting start time and end times to wait for transitional effects to subside in the liquid crystal before turning on LEDs helps the display illumination system to generate images having reduced color cross talk and/or image content cross talk.

The start times and end time can also be advantageously adjusted dynamically to support different types of display content. For example, the adjustments made for start time and end times can differ based on the content being display—compare a high-frame rate video or high frame rate update due to increased user movement having a first set of adjustment settings to a static image displayed or images displayed while a user is sitting still having a second set of adjustment settings.

LEDs can be calibrated during a manufacturing process for a desired display brightness and white point. In particular, LED calibration can include luminous flux and luminous intensity calibration. Luminous flux (in lumens) is a measure of the total amount of light a lamp puts out. The luminous intensity (in candelas) is a measure of how bright the beam in a particular direction is. Luminous intensity is roughly proportional to the amount of current (I) supplied to the LED. The greater the current, the higher the intensity. LED calibration can be performed for colors (e.g., red, green, blue, and white) of light sources of the display illumination system. The colors can cover the entire visible range of colors. Calibration can be specifically performed for a subframe and a set of PWM controls signals for a defined portion of the subframe.

In one embodiment, the display illumination system is configured for a head-mounted display device. The display illumination system is operably coupled to an augmented-reality emitter that emits light to an eye of a user using the HMD device to provide an augmented reality image. The driving scheme of the display illumination system causes the augmented-reality image to appear with stable color and without perceived flicker even when altering the brightness of the image.

In embodiments, the augmented-reality image is locked to a location in a real-world scene and maintained in the locked location. The image is maintained in the locked location even with movement in the head-mounted display unit. By way of example, the augmented-reality image, as perceived by a user wearing the head-mounted display unit, is locked to a real world location. However, the augmented-reality image is projected in a different location of the head-mounted display unit display component as the head-mounted display unit moves to maintain the augmented-reality image in the locked location. By generating multiple PWM controlled light pulses to stimulate the human eye during a single color subframe, the effect of perceived flicker is reduced even with locked augmented-reality images.

With reference to FIG. 1, exemplary images of a head-mounted display (HMD) device 102 are depicted. Augmented-reality images (e.g., 104A, 104B and 104C), provided by the HMD device, generally appear superimposed on a background and may appear to interact with or be integral with the background. The background is comprised of real-world scene, e.g., a scene that a user would perceive without augmented-reality image emitted by the HMD device. For example, the recipe book icon 104C can appear superimposed and hanging in mid-air in front of the cooking oven or wall.

Figure 2:
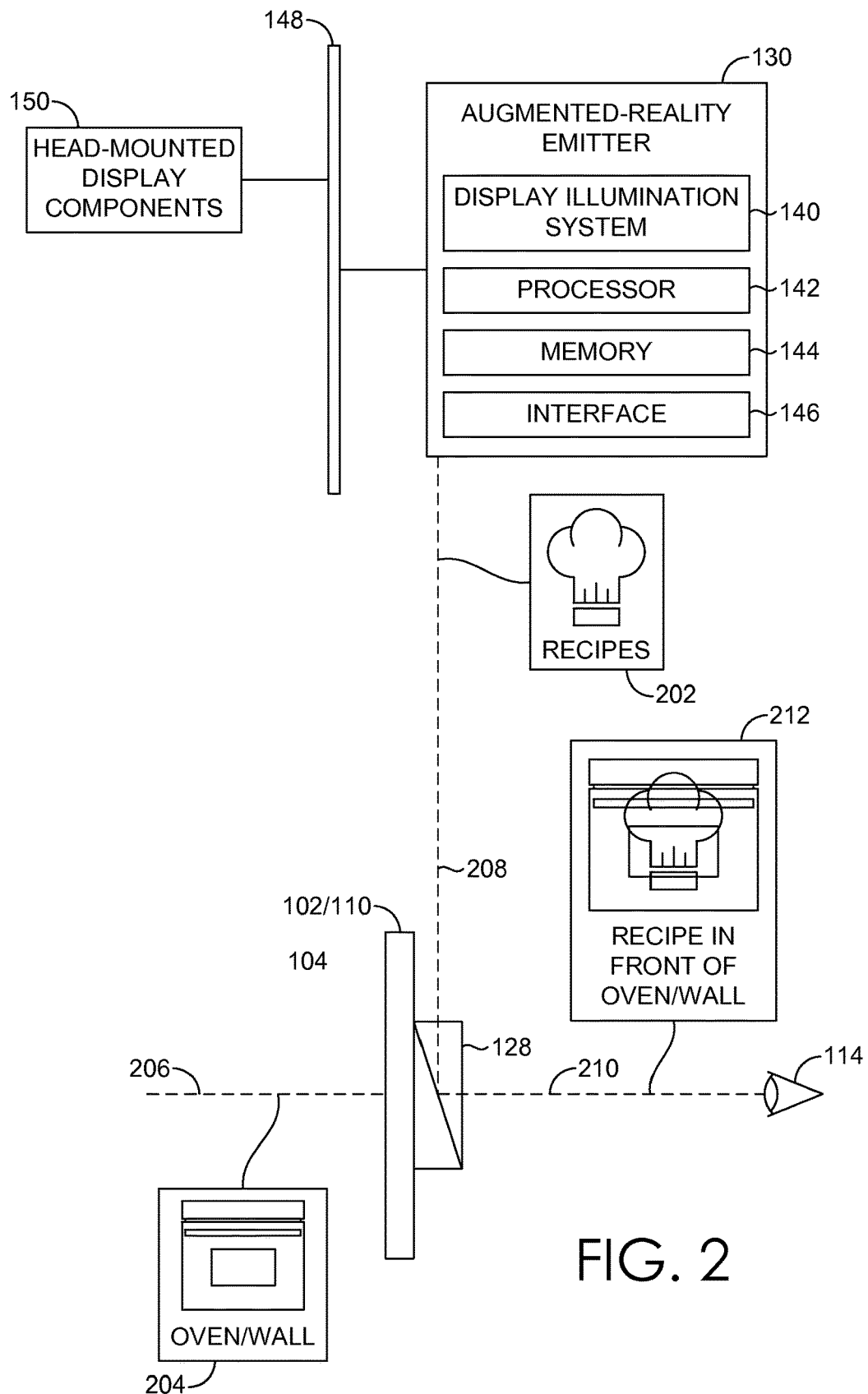
FIG. 2 is a block diagram of an exemplary head-mounted display unit, in accordance with embodiments of the present invention.

Turning to FIG. 2, the HMD device 102 having the display illumination system 140 is described in accordance with an embodiment described herein. The HMD device 102 includes a see-through lens 110, which is placed in front of a user's eye 114, similar to an eyeglass lens. A pair of see-through lenses 110 can be provided, one for each eye 114. The lens 110 includes an optical display component 128, such as a beam splitter (e.g., a half-silvered minor). The HMD device 102 includes an augmented-reality emitter 130 having the display illumination system 140 that facilitates altering the brightness of augmented-reality images. Amongst other components not shown, the HMD device also includes a processor 142, memory 144, interface 146, a bus 148, and additional HMD components 150. The augmented-reality emitter 130 includes the display illumination system 140 having several components including an LCD with LEDs backlights, the LCD can emit a 2-D color image in a small area, the image can be displayed as an augmented-reality image in a real-world scene. The augmented-reality emitter 130 emits light representing an augmented-reality image 202 exemplified by a light ray 208. Light from the real-world scene 204, such as a light ray 206, reaches the lens 110. Additional optics can be used to refocus the augmented-reality image 202 so that it appears to originate from several feet away from the eye 114 rather than one inch away, where the display component 128 actually is. The memory 144 can contain instructions which are executed by the processor 142 to enable the augmented-reality emitter 130 to perform functions as described. One or more of the processors can be considered to be control circuits. The augmented-reality emitter communicates with the additional HMD components 150 using the bus 148 and other suitable communication paths.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The augmented-reality image 202 is reflected by the display component 128 toward a user's eye, as exemplified by a light ray 210, so that the user sees an image 212. In the image 212, a portion of the real-world scene 204, such as, a cooking oven is visible along with the entire augmented-reality image 202 such as a recipe book icon. The user can therefore see a mixed-reality image 212 in which the recipe book icon is hanging in front of the cooking oven in this example.

Figure 3:
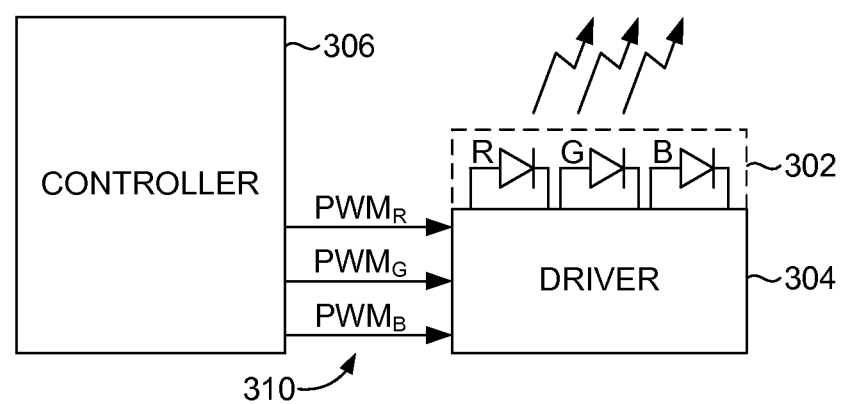
FIG. 3 is a block diagram showing components of an exemplary display illumination system, in accordance with embodiments of the present invention.

With reference to FIG. 3, FIG. 3 illustrates a schematic circuit diagram of one embodiments of a display illumination system 140. The display illumination system 140 includes a plurality of light sources 304, a driver circuit 304 and a controller 306. Embodiments of the display illumination system 140 can be implemented in various applications. One application in which the display illumination system 140 can be implemented is an LCD display. In one embodiment, the plurality of light sources 302 includes multiple LEDs, however, other embodiments can use other types of light sources. The LEDs 302 include different colors of LEDs. For example, the LEDs 302 can include red, green, and blue (RGB) LEDs. Each color can be produced by a single LED 302 or a group (e.g., array) of LEDs 302. RGB LEDs 302 can be implemented in order to produce white light, in some instances when the red, green and blue lights are combined.

The driver circuit includes circuitry to facilitate driving the LEDs 302. In implementations that use LEDs 302, the driver circuit 304 can include a switch (e.g., a MOSFET—metal-oxide-semiconductor field-effect transistor), and a current-limiting resistor connected in series with the switch and the LED. The driver circuit 304 receives one or more supply signals from the controller 306. In embodiments, the supply signals 310 determine the color and brightness of the LEDs 302. Where the LEDs 302 are used, the supply signals 310 can be pulse-width modulated (PWM) signals. For example, the PWM signals 310 can include a $PWM_R$ signal for the red LEDs 302, a $PWM_G$ signal for the green LEDs 302, and a $PWM_B$ signal for the blue LEDs 302.

Figure 4:
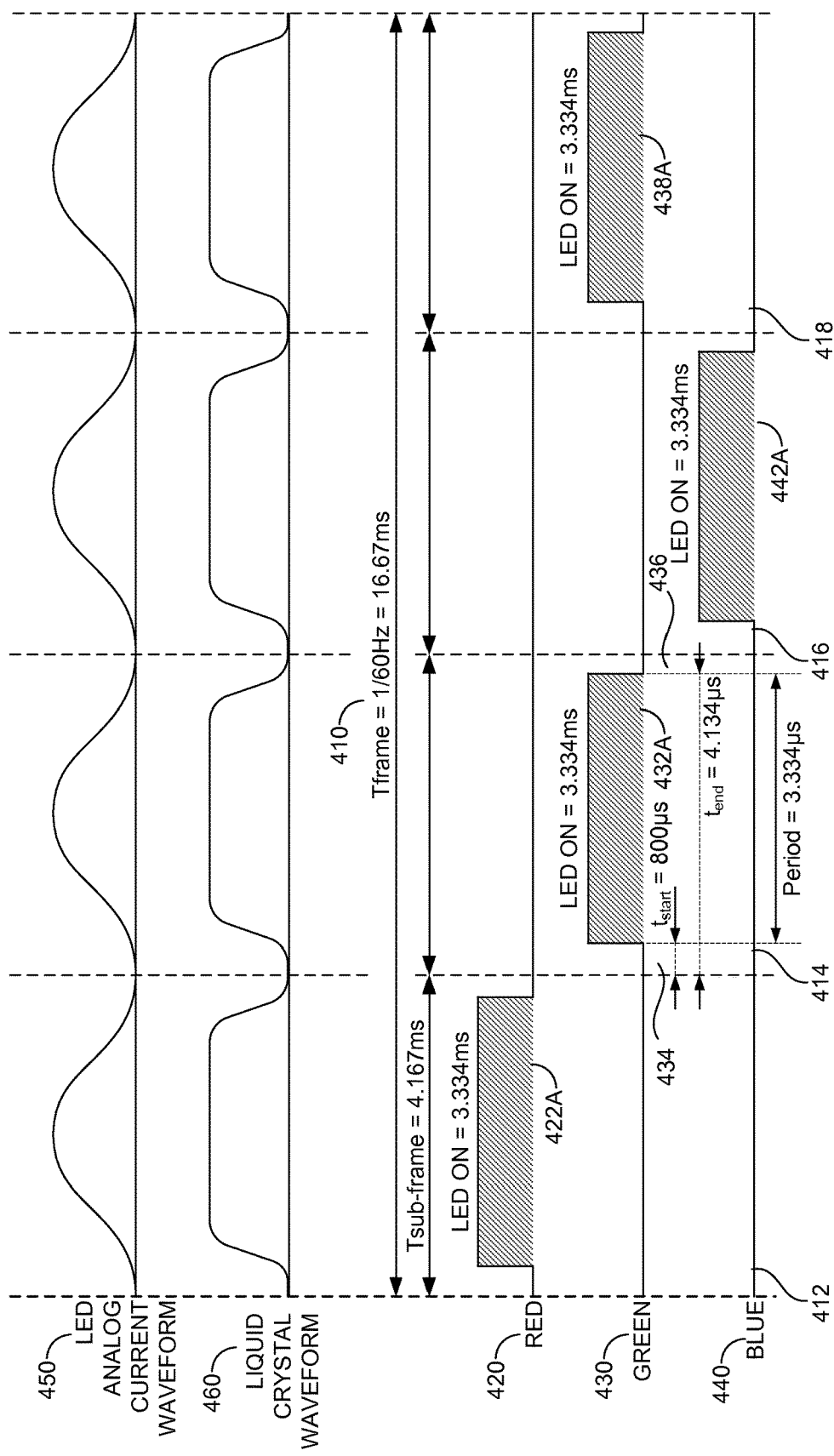
FIG. 4 is a schematic of an operating environment for implementing driving schemes, in accordance with embodiments of the present invention.

With reference to FIG. 4, FIG. 4 illustrates an exemplary driving scheme operating environment in accordance with embodiments described herein. The exact values of attributes (e.g., light sources, TFrame, Tsubframe, LED ON, Tstart and Tend) of a driving scheme may differ from the values shown in FIG. 4, and the values shown are not meant to be limiting. A driving scheme of the display illumination system 140 can be defined for an image frame, Tframe 410. The Tframe 410 in this case has a refresh rate of 1/60 Hz-16.67 ms. The Tframe 410 can include a plurality of subframes (e.g., Tsubframe) corresponding to one of a plurality of light sources. Tsubframes include Tsubframe 412, Tsubframe 414, Tsubframe 416, and Tsubframe 418. FIG. 4 includes light sources for red, blue, and green as shown as red 420, green 430, and blue 440 and LED analog current 450 and liquid crystal 460.

The shaded portions of the Tsubframes indicate a region where PWM signals can be used to control brightness of the Tframe 410 based on generating two or more PWM control signals for each portion of the subframe. The PWM control signal control the analog LED current 450 for each of the plurality LED light sources during a corresponding subframe. The shaded portions (422A, 432A, 442A) are defined based on an adjusted start time and an adjusted end time within the frame. The adjusted start time and the adjusted end time are defined based on a selected location within the a selected subframe where transitional effects have subsided in liquid crystals, where the transitional effects render color cross-talk and image cross-talk. For example, Tstart 436=800 μs and Tend 438=4.134 μs for the corresponding liquid crystal 460 where the transitional effects have subsided. The Tstart and Tend define and LED ON duration (e.g, 3.3334 ms) for the corresponding light source based on the PWM signal. The Tend of a previous subframe and Tstart of a subsequent subframe define a Tblank portion, discussed below. A duty cycle of the PWM is used to adjust brightness. The duty cycle for each individual color can be set to a different value, as such, each color is not required to have the same value for a duty cycle. The maximum brightness of the display is calibrated for a white-point during manufacturing, as discussed herein below.

Figure 5:
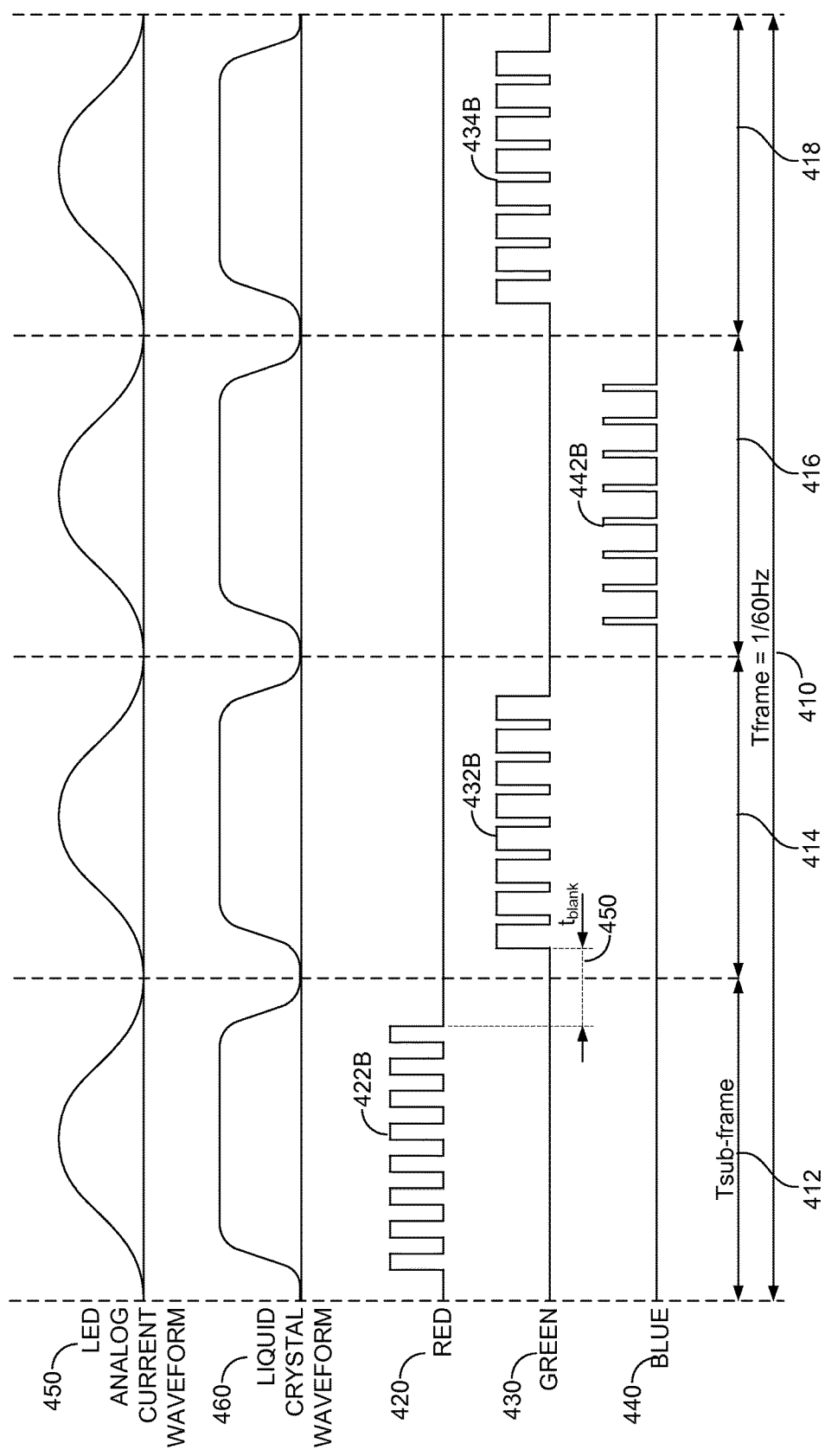
FIG. 5 is a schematic of an exemplary driving scheme, in accordance with embodiments of the present invention.

Turning to FIG. 5, FIG. 5 illustrates an exemplary driving scheme in accordance with embodiments described herein. The driving scheme is implemented to maintain color stability and reduce flicker when the brightness of an image is altered. The display illumination system 140 includes a PWM control circuit for generating a first set of control signals 422B for a first light source (RED 420). The first set of PWM control signals is generated for a first defined portion of a first subframe of a frame. The display illumination system 140 also generates a second set of PWM control signals 432B for a second light source (GREEN 432B), the second set of PWM control signals is generated for a second defined portion of a second subframe of the frame. The display illumination system 140 can generate a third set of PWM control signals 442B for a third light source (BLUE 440), the third set of PWM control signals is generated for a third defined portion of a third subframe of the frame. One or more additional sets of PWM control signals (GREEN 434B) can be generated for one or more subframes of the frame, an additional set of PWM controls corresponds to a selected light source, where the selected light source is a red, green, or blue LED.

Generating the PWM control signals is based on the LED analog current 450 and liquid crystal 460 as discussed above. For example, a Tblank portion (Tblank 450) having no PWM control signals between a first subframe set of PWM control signals and second subframe set of PWM control signals can be defined based on an adjusted Tend time of the first subframe and a Tstart time of a second subframe, where the adjusted start time and the adjusted end time are defined based on a selected location within the a selected subframe where transitional effects have subsided in liquid crystals, where the transitional effects render color cross-talk and image cross-talk.

FIG. 5, in particular, illustrates multiple PWM controls signals 422B, 433B, 442B and 434B that advantageously maintain a constant or approximately constant LED emission time. The emission time of control signals between a Tstart and a Tend can be about the same at high and low display brightness settings. A single control signal would cause the LED emission to vary because the control signal would be very short at low brightness settings and close to the entire subframe at a max brightness of the display. In an alternate embodiment, using multiple PWM control signals for subframes within an image frame may result in a power-savings because local dimming may be implemented. Further, optical effects in areas where no image content is displayed in the eye-box may be reduced because the LEDs in those areas of an image where no content is displayed can be individually turned down.

In addition, multiple PWM controlled light pulses stimulate the human eye during a single color subframe, such that, the effect of perceived flicker is reduced. Conventional single PWM pulses per color frame can cause perceived image flicker. Multiple PWM controls signals can advantageously support a distributed emission time. The plurality of control signals are generated during an emission time that is distributed over a series of control signals or pulses, in contrast to a single control signal that would cause the LED emission over a concentrated emission time. The optical effect of a distributed emission is reduced perceived flicker as the distance between triggering controls signals is also shortened.

Figure 6:
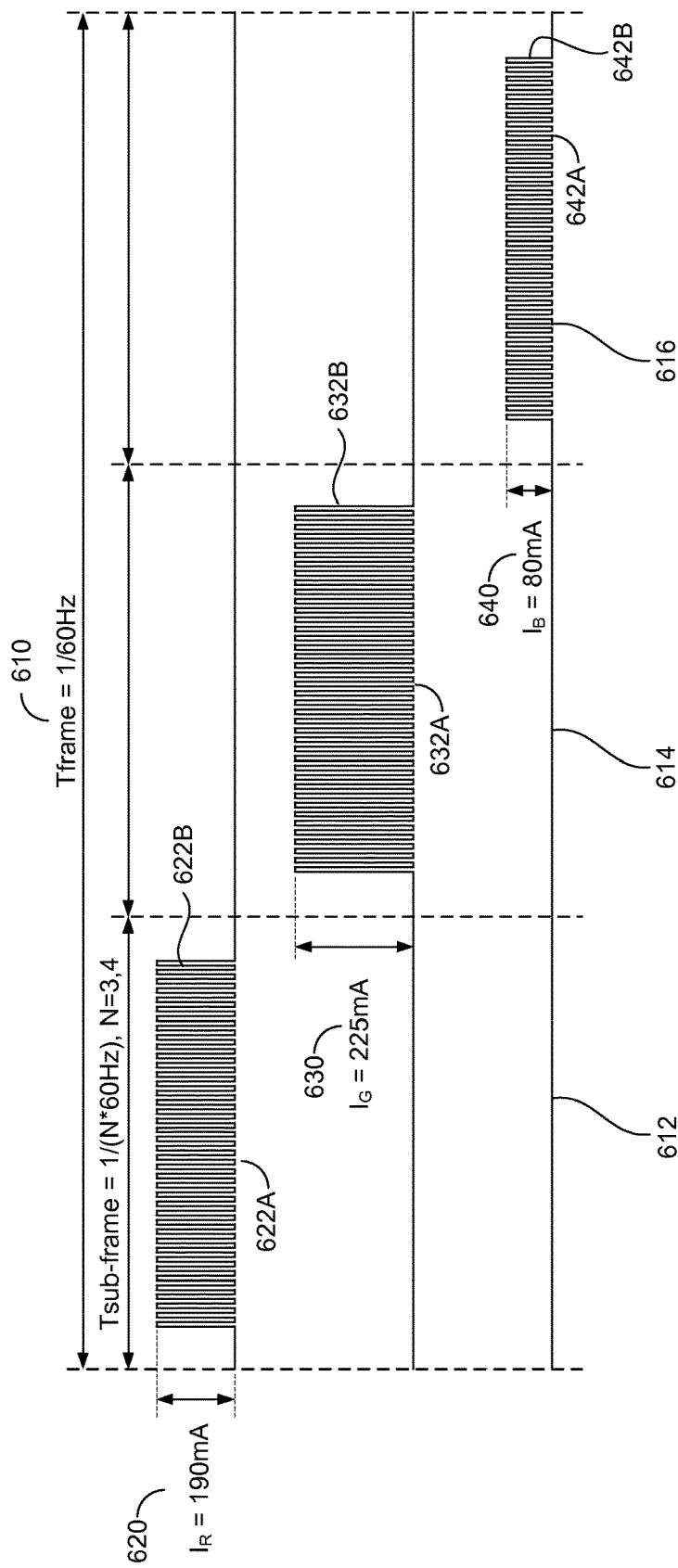
FIG. 6 is a schematic of an exemplary calibration operation, in accordance with embodiments of the present invention.

With reference to FIG. 6, FIG. 6 illustrates a schematic of an exemplary calibration operation. The LEDs can be calibrated during a manufacturing process for a desired display brightness and white point. In particular, LED calibration can include luminous flux and luminous intensity calibration. Luminous flux (in lumens) is a measure of the total amount of light a lamp puts out. The luminous intensity (in candelas) is a measure of how bright the beam in a particular direction is. Luminous intensity is roughly proportional to the amount of current (I) supplied to the LED. The greater the current, the higher the intensity. LED calibration can be performed for colors (e.g., red 620, green 630, and blue 640) of light sources of the display illumination system. The colors can cover the entire visible range of colors. Calibration can be specifically performed for a frame (e.g., Tframe 610) having a plurality of subframes (e.g., subframes 612, 614, and 616) and a set of calibration current signals (e.g., 622, 632, and 642) for a defined portions of the subframe. The exact values for attributes (e.g., Tframe, Tsubframe, and Current (I)) of the calibration operation may differ from values shown, the values shown are also not meant to be limiting.

Figure 7:
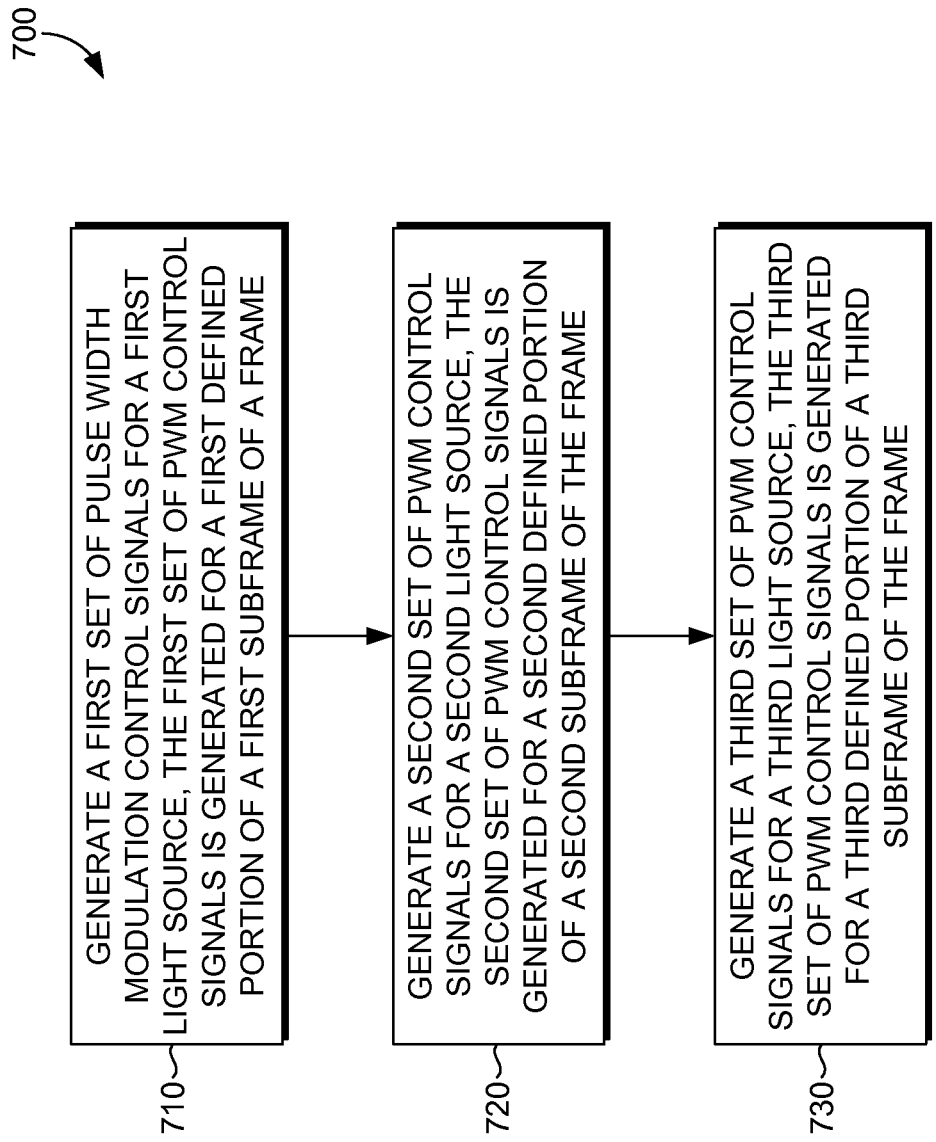
FIG. 7 is a flow diagram showing a method for changing brightness of a display, in accordance with embodiments of the present invention.

With reference to FIG. 7, a method for changing brightness of a display is provided. Initially at block 710, a first set of pulse width modulation control signals for a first light source is generated. The first set of PWM control signals is generated for a first defined portion of a first subframe of a frame. At block 720, a second set of PWM control signals for a second light source is generated. The second set of PWM control signals is generated for a second defined portion of a second subframe of the frame. At block 730, a third set of PWM control signals for a third light source is generated, the third set of PWM control signals is generated for a third defined portion of a third subframe of the frame. The light sources can be a light emitting diode (LED) where the first light source is red, the second light source is green, and the third light source is blue.

The first defined portion of the first subframe, the second defined portion of the second subframe, and the third defined portion of the third subframe are defined based on an adjusted start time and adjusted end time, the adjusted start time and the adjusted end time define a period of time for generating a corresponding set of PWM control signals. The adjusted start time and the adjusted end time are defined based on a selected location within the a selected subframe where transitional effects have subsided in liquid crystals, where the transitional effects render color cross-talk and image cross-talk. Moreover, a set of PWM control signals within a subframe comprises multiple PWM pulses during a selected color a corresponding light source, the multiple PWM pulses reduce the effect of perceived flicker.

Turning to FIG. 8 the client computing device 810 may include any type of computing device, such as the computing device 100 described with reference to FIG. 1, for example. A plurality of client computing devices 810 may be associated with the distributed storage system 800. The client computing device 810 may be used to retrieve data stored any of the one or more zones described herein.

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Accordingly, in a first embodiment described herein, a method for changing brightness of a display comprising a display illumination system is provided. The method includes generating a first set of pulse width modulation control signals for a first light source, the first set of PWM control signals is generated for a first defined portion of a first subframe of a frame. The method further includes generating a second set of PWM control signals for a second light source, the second set of PWM control signals is generated for a second defined portion of a second subframe of the frame. The method also includes generating a third set of PWM control signals for a third light source, the third set of PWM control signals is generated for a third defined portion of a third subframe of the frame.

In a second embodiment described herein, a display illumination system is provided. The system includes a plurality of light sources. The system also includes a pulse width modulation (PWM) control circuit operably coupled to the plurality of light sources, the pulse width modulation control circuit supports light emitting diode (LED) sequencing, wherein the PWM control circuit drives the plurality of light sources based on: generating control signals for two or more subframes of an image frame, wherein generating the control signals for the two or more subframes comprises: generating at least two control signals for a first subframe of the image frame; and generating at least two control signals for a second subframe of the two or more subframes.

In a third embodiment described herein, a head-mounted display device is provided. The head-mounted display device includes a processor and a memory configured for providing computer program instructions to the processor. The system also includes a see-through screen coupled to the display illumination system. The system further includes a pulse width modulation (PWM) circuit coupled to the plurality of light source, the pulse width modulation control circuit supports light emitting diode (LED) sequencing of the plurality of light source, where the PWM control circuit drives the plurality of light sources based on generating a set of PWM control signals for a light source of a subframe of the two or more subframes of an image frame, wherein generating the set of PWM control signals for the two or more subframes includes: generating at least two PWM control signals for a first subframe of the two or more subframes, the at least two control signals is generated for a first defined period of the first subframe; and generating at least two PWM control signals for control signals for a second subframe of the two or more subframes, the at least two signals is generated for a second defined period of the second subframe.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display unit; however the head-mounted display unit depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A head-mounted display device, comprising:
a see-through screen;
an LED array optically coupled to the see-through screen; and
a pulse width modulation (PWM) circuit coupled to the LED array, the pulse width modulation control circuit configured to:
generate at least two PWM control signals for a first subframe of the two or more subframes, the at least two control signals are generated for a first defined period of the first subframe;
generate at least two PWM control signals for a second subframe of the two or more subframes, the at least two signals are generated for a second defined period of the second subframe;
wherein the first defined period of the first subframe is defined based on an adjusted start time and an adjusted end time, the adjusted start time and the adjusted end time are defined based on a transitional effects time period of liquid crystals of the head-mounted display device, wherein the adjusted start time and the adjusted end time define a period for generating the at least two PWM control signals for the first subframe.

2. The device of claim 1, wherein a set of PWM control signals within a subframe comprises multiple PWM control signals having a distributed emission time during a selected color of a corresponding LED, the multiple PWM control signals having the distributed emission time reduces the effect of perceived flicker.

3. The device of claim 1, wherein the adjusted start time and the adjusted end time are dynamically generated based at least in part on user movement associated with the head-mounted device, wherein the user movement impacts a rate at which images are generated based on the at least two PWM control signals for the first subframe.

4. The device of claim 1, wherein the adjusted start time and the adjusted end time are dynamically defined based on a selected location, within a selected subframe, where transitional effects have subsided in the liquid crystals, wherein the transitional effects would render color cross-talk and image cross-talk.

5. The device of claim 1, wherein the LED array generates an augmented-reality image in a real-world locked location, the augmented-reality image being displayed in a different location of a display component of the head-mounted display device.

6. The device of claim 1, wherein a set of PWM control signals are for a light source, wherein the light source is one of the following: a red LED light source, a green LED light source, or a blue LED light source.

7. The device of claim 1, wherein the two or more subframes are associated with an image frame, wherein the image frame is presented for a defined refresh rate and time period and each subframe corresponds to a defined portion of the time period.

8. The device of claim 1, wherein during a manufacturing process, current is used to calibrate a white-point for a plurality of LEDs, of the LED array, based on a plurality of current signals transmitted to each of the two or more subframes.

9. A head-mounted display device, comprising:
a see-through screen;
an LED array optically coupled to the see-through screen; and
a pulse width modulation (PWM) circuit coupled to the LED array, the pulse width modulation control circuit configured to:
generate at least two PWM control signals for a first subframe of the two or more subframes, the at least two control signals are generated for a first defined period of the first subframe; and generate at least two PWM control signals for a second subframe of the two or more subframes, the at least two signals are generated for a second defined period of the second subframe, wherein the first defined period of the first subframe or the second defined period of the second subframe are defined based on an adjusted start time and an adjusted end time, the adjusted start time and the adjusted end time defined based on a transitional effects time period of liquid crystals of the head-mounted display device, wherein the adjusted start time and the adjusted end time define a period for generating a corresponding at least two PWM control signals.

10. The device of claim 9, wherein a set of PWM control signals within a subframe comprises multiple PWM control signals having a distributed emission time during a selected color of a corresponding LED, the multiple PWM control signals having the distributed emission time reduces the effect of perceived flicker.

11. The device of claim 9, wherein the adjusted start time and the adjusted end time are dynamically adjusted based at least in part on user movement associated with the head-mounted display device, wherein the user movement impacts a rate at which images are generated based on the corresponding at least two PWM control signals.

12. The device of claim 9, wherein the adjusted start time and the adjusted end time are dynamically defined based on a selected location, within a selected subframe, where transitional effects have subsided in the liquid crystals, wherein the transitional effects would render color cross-talk and image cross-talk.

13. The device of claim 9, wherein the LED array generates an augmented-reality image in a real-world locked location, the augmented-reality image being displayed in a different location of a display component of the head-mounted display device.

14. The method of claim 9, wherein a set of PWM control signals are for a light source, wherein the light source is one of the following: a red LED light source, a green LED light source, or a blue LED light source.

15. A head-mounted display device, comprising:
a see-through screen;
an LED array optically coupled to the see-through screen; and
a pulse width modulation (PWM) circuit coupled to the LED array, the pulse width modulation control circuit configured to:

generate a first set of pulse width modulation control signals for a first light source, the first set of PWM control signals generated for a first defined period of a first subframe of a frame;

generating a second set of PWM control signals for a second light source, the second set of PWM control signals generated for a second defined period of a second subframe of the frame;

generating a third set of PWM control signals for a third light source, the third set of PWM control signals generated for a third defined period of a third subframe of the frame;

wherein the first defined period of the first subframe, the second defined period of the second subframe, and the third defined period of the third subframe are defined based on corresponding adjusted start times and adjusted end times, wherein an adjusted start time and an adjusted end time are defined based on a transitional effects time period of liquid crystals of the head-mounted display device, wherein the adjusted start time and the adjusted end time define a period for generating a corresponding set of PWM control signals.

16. The device of claim 15, wherein a light source is a light emitting diode (LED), wherein the first light source is a red LED, the second light source is a green LED, and the third light source is a blue LED.

17. The device of claim 15, further comprising generating one or more additional sets of PWM control signals for one or more subframes of the frame, an additional set of PWM controls corresponds to a selected light source, wherein the selected light source is a red, green, or blue LED.

18. The device of claim 15, wherein the adjusted start time and the adjusted end time are dynamically based at least in part on user movement associated with the head-mounted device, wherein the user movement impacts a rate at which images are generated based on a set of two PWM control signals.

19. The device of claim 15, wherein the adjusted start time and the adjusted end time are dynamically defined based on a selected location, within a selected subframe, where transitional effects have subsided in the liquid crystals, wherein the transitional effects would render color cross-talk and image cross-talk.

20. The device of claim 15, wherein a set of PWM control signals within a subframe comprises multiple PWM control signals having a distributed emission time during a selected color of a corresponding light source, the multiple PWM control signals having the distributed emission time reduces the effect of perceived flicker.

* * * * *